United States Patent [19]

Kaplan

[11] Patent Number: 4,564,935
[45] Date of Patent: Jan. 14, 1986

[54] TROPOSPHERIC SCATTER COMMUNICATION SYSTEM HAVING ANGLE DIVERSITY

[75] Inventor: Philip D. Kaplan, Nashua, N.H.

[73] Assignee: The United States of America as represented by the Secretary of the Air Force, Washington, D.C.

[21] Appl. No.: 569,644

[22] Filed: Jan. 10, 1984

[51] Int. Cl.⁴ .............................................. H04B 7/08
[52] U.S. Cl. ..................................... 370/38; 343/373; 343/381; 455/276
[58] Field of Search ............... 343/373, 380, 381, 382, 343/383, 384, 853; 455/137, 273, 276, 277, 278; 370/38; 375/100

[56] References Cited

U.S. PATENT DOCUMENTS

| | | | |
|---|---|---|---|
| 3,618,092 | 11/1971 | Waineo | 343/853 |
| 3,618,093 | 11/1971 | Dickey | 343/17.1 R |
| 3,702,479 | 11/1972 | Uhrig | 343/705 |
| 3,824,500 | 7/1974 | Rothenberg | 343/373 |
| 4,075,566 | 2/1978 | D'Arcangelis | 455/276 |
| 4,196,436 | 4/1980 | Westerman | 343/381 |

Primary Examiner—Joseph A. Orsino, Jr.
Attorney, Agent, or Firm—Donald J. Singer; Richard J. Donahue

[57] ABSTRACT

A tropospheric scatter communication system provides diverse angle transmission paths which may be utilized alone or in conjunction with frequency and/or other known diversity system arrangements for improved performance. The diverse angle transmission paths are routed through sum and difference "monopulse" beams displaced in azimuth.

4 Claims, 4 Drawing Figures

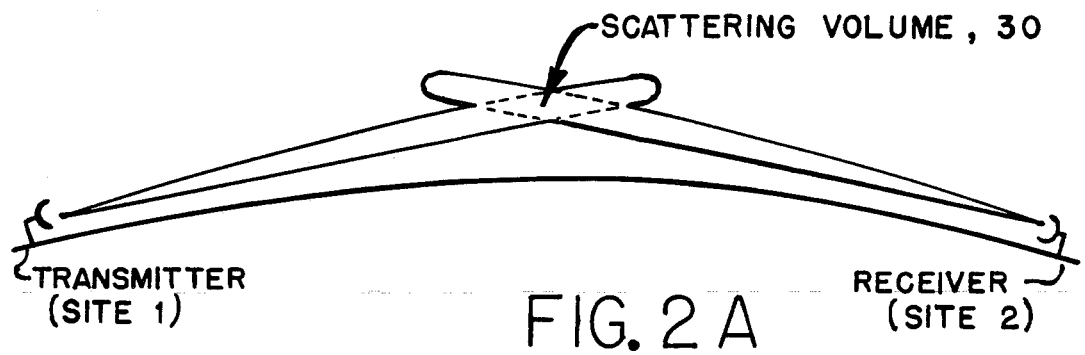
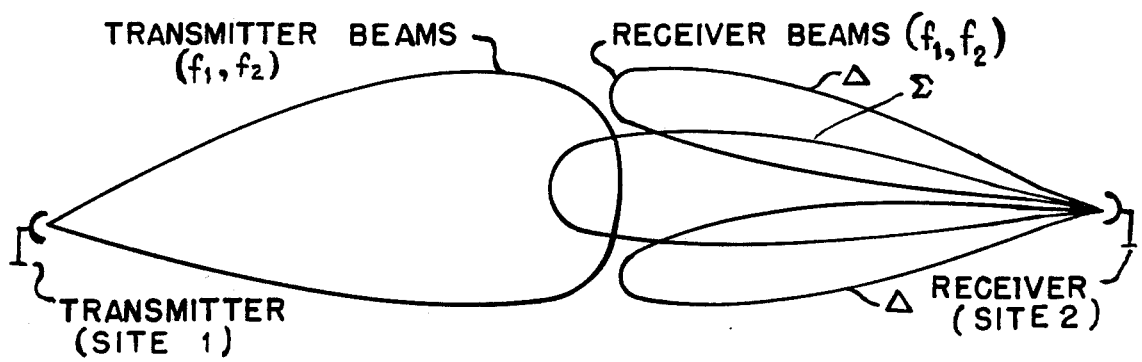
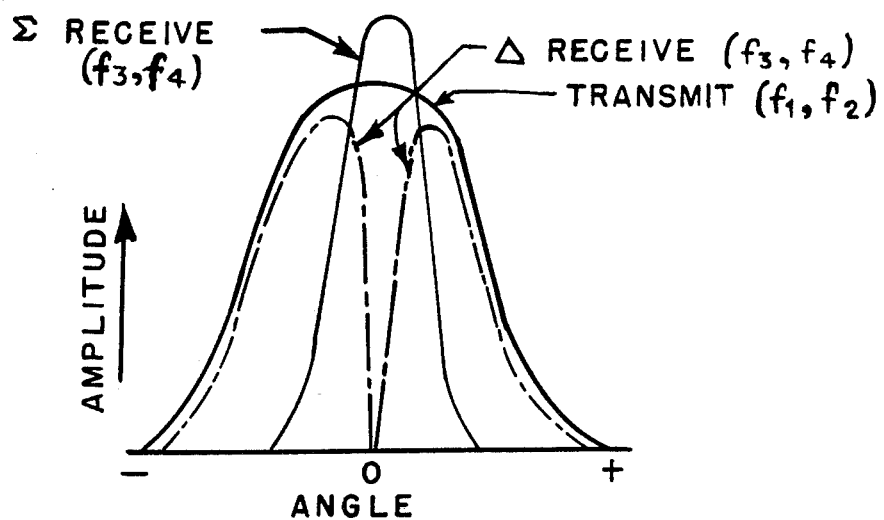

TROPOSPHERIC SCATTER COMMUNICATION SYSTEM HAVING ANGLE DIVERSITY

STATEMENT OF GOVERNMENT INTEREST

The invention described herein may be manufactured and used by or for the Government for governmental purposes without the payment of any royalty thereon.

BACKGROUND OF THE INVENTION

The present invention relates to a tropospheric scatter communication system, and more particularly, to a tropospheric scatter communication system having an angle diversity response capability.

Tropospheric communication has emerged from its uncertain beginnings in the early nineteen fifties to become a robust communication system that fills a gap between line-of-sight microwave links and long range HF or LF links. Tropospheric forward scatter occurs in the region between the stratosphere and the earth's surface in the presence of "blobs" of atmosphere having refractive index variations. Such variations are the result of differences in temperature, pressure and gaseous constituents, the main variable being water vapor. When irradiated by microwave or UHF signals the blobs re-radiate the signals in all directions, some of which scatter in the forward direction to produce electromagnetic fields at the receiving location.

The collection and analysis of empirical data from experimental and operational tropospheric scatter sites characterize its statistical performance in terms of short term and long term amplitude-time distributions. Short term distributions, measured over intervals of tens of seconds, describe a Rayleigh distribution, from which hourly median values are obtained. Long term distributions represent the variation of the hourly median values over longer periods of time, a month a season or year, and vary considerably with the season of the year and with geographical location.

Methods of coping with short term (Rayleigh) fading have been devised through the use of "diversity" transmission paths; paths that are independent and therefore afford greater reliability than a single transmitter/receiver at each end. Effectively proven methods employ space diversity, (two or more antennas spaced approximately 200 wavelengths apart), frequency diversity, (two or more carriers separated in the MHz), polarization diversity, and time diversity (repetition of the same information when slow data rates are involved).

The use of any one method may be utilized independently in dual diversity, or may be combined judiciously in quadruple diversity. In many operational systems, space and frequency diversity are combined to provide reliable communication links. However, since two widely separated antennas are required for space diversity, this necessitates a large communications site. Furthermore, substantial costs are involved in the construction of the remote second antenna, its mounting base, and the transmission of signals thereto.

SUMMARY OF THE INVENTION

It is therefore an object of the present invention to provide a tropospheric scatter communication system of improved performance and reduced cost.

It is another object of the present invention to provide a tropospheric scatter communication system having angle diversity.

It is a further object of the present invention to provide a tropospheric scatter communication system having both diverse angle and diverse frequency signal paths.

The angle diversity system disclosed herein provides an independent (dual diversity) transmission path having desirable cost saving features and which when combined with frequency diversity (quad diversity) or additionally with polarization or time diversity (eight fold diversity) provides increasingly higher system reliability.

In the angle diversity mode described herein, alternate angle transmission paths are routed through sum and difference "monopulse" beams formed by a dual-feed antenna whose feed elements are displaced in azimuth. The received sum and difference signals are compared at the receiver site and the signal having the greatest amplitude is selected for further processing and use.

BRIEF DESCRIPTION OF THE DRAWINGS

The foregoing and other objects of the invention will be more clearly understood from the following description and accompanying drawings, in which:

FIGS. 2A and 2B are illustrations of the vertical and azimuthal antenna pattern linking relationships respectively of a pair of communication sites utilizing the present invention; and FIG. 3 is a graph depicting the transmitter and receiver azimuthal plane antenna gain patterns of a single site.

DESCRIPTION OF THE PREFERRED EMBODIMENT

Figure 1:
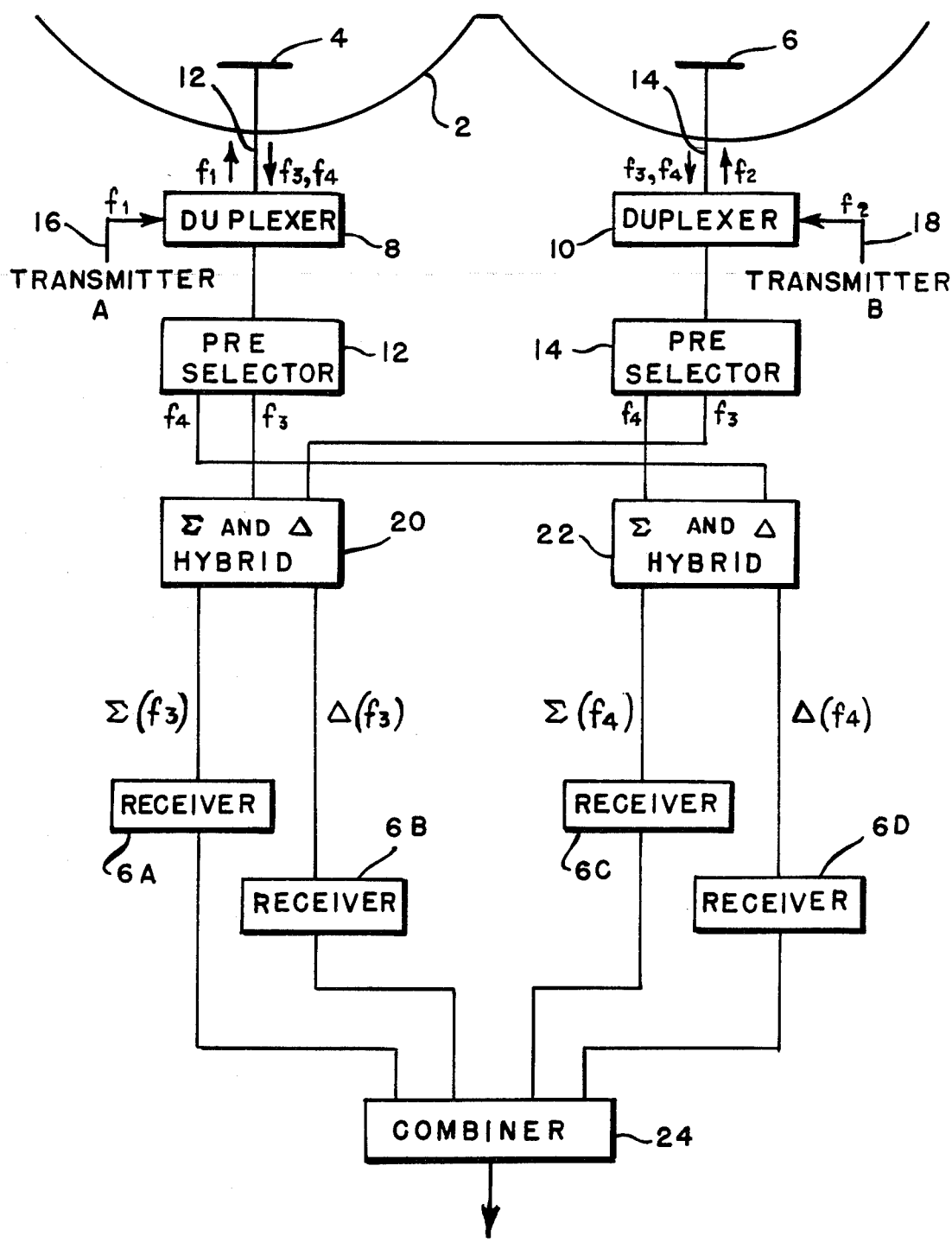
FIG. 1 is a functional block diagram representation of the present invention.

FIG. 1 is a functional block diagram of the quadruple (angle/frequency) diversity implementation of the present invention. A dual feed antenna 2 having feed elements 4 and 6 with displaced phase centers in the azimuthal plane, simultaneously serves a pair of transmitters, denoted transmitter A and transmitter B, and four monopulse receivers 6A–6D. Transmitters A and B and receivers 6A–6D are isolated through duplexers 8 and 10. Feed elements 4 and 6 are connected to duplexers 8 and 10 via feed lines 12 and 14 respectively. Transmitters A and B operate at "diverse" frequencies $f_1$ and $f_2$ and their output signals are applied via their respective output leads 16 and 18 to duplexers 8 and 10 respectively and thence to their respective feed elements 4 and 6. Thus one half of the available aperture of antenna 2 in the azimuthal plane transmits at frequency $f_1$ and the other half transmits at frequency $f_2$.

On receive, signals at two frequencies, $f_3$ and $f_4$, arrive at both of the antenna feed elements 4 and 6, pass through duplexers 8 and 10 and preselectors 12 and 14, to form separated signals of frequencies $f_3$ and $f_4$ at the outputs of each of the preselectors 12 and 14. These signals are then combined in sum and difference hybrid circuits 20 and 22 and yield the quadruple diversity channels $\Sigma(f_3)$, $\Delta(f_3)$, $\Sigma(f_4)$, $\Delta(f_4)$ for application to the four receivers 6A–6D. The four channel receiver outputs are then "combined" in a post detection combiner unit 24 using conventional circuitry and methods.

The preferred combining process entails individual amplitude detectors associated with each of the quadruple diversity channels. The channel exhibiting maximum amplitude at any given time is selected for further information processing, while the other three channels go unused. This preferred post detection combining process offers greater reliability than predetection combiners, with nearly identical signal to noise ratios.

FIGS. 2A and 2B, illustrate the transmitter and receiver antenna pattern relationships in the vertical and azimuthal planes respectively. In the vertical plane the scattering volume 30 is seen at the intersection of the transmitter and receiver beams. The relationships between the sum ($\Sigma$) and difference ($\Delta$) beam patterns in the azimuthal plane are shown in FIG. 2B. For the $\Sigma$ pattern the scattering volume resides directly above the great circle path joining the transmitter and receiver. For the $\Delta$ pattern, the scattering volume resides on either side of the $\Sigma$ scattering volume.

FIG. 3 illustrates the azimuthal plane antenna gain patterns at a single communications site. It will be noted that the $\Delta$ Receive antenna pattern is symmetrically disposed on either side of the $\Sigma$ Receive pattern. Further, it is included within the angle occupied by the Transmit pattern and that each has approximately one half the power of the $\Sigma$ Receiver pattern.

The utilization of angle diversity as an alternate transmission path through the generation of "monopulse" antenna beams provides a performance advantage over space diversity, as seen in the following example:

DEW Line tropospheric scatter sites utilize pairs of 60 foot reflector dishes separated by approximately 250 feet to achieve space diversity in combination with frequency diversity. By design, the signals that arrive at the antennas are uncorrelated and accordingly the transmitter gain, receiving aperture, and beamwidth (nominally 1.5°) are governed by the individual antenna size (normally 60 feet).

As an alternative, the angle diversity implementation described herein would mount two 60 foot dishes side-by-side. In such proximity, the signals at the two feeds are essentially correlated. Thus the receiving aperture is essentially doubled; the $\Sigma$ azimuthal beam approaches 0.75°, and the beams approach 1.5°. The emitted radiation power, however, would be akin to the space diversity case, as the two half apertures are emitting separate frequencies. Signal to noise improvement may therefore approach 3 dB.

Furthermore, single installation of the massive antenna mounts would appear to be less costly and the construction more conveniently maintained than the alternative. In particular, as the tropo sites serving the DEW Line operate as relay links, the case for single antenna installation is doubly advantageous.

Although the invention has been described with reference to the preferred embodiment thereof, it will be understood to those skilled in the art that the invention is capable of a variety of alternative embodiments within the spirit and scope of the appended claims. If, for example, it is desired to provide a system having only angle diversity (dual diversity), the system would utilize only one of the pair of feed elements 4 or 6 for transmitting the single frequency. This is the case since the use of both of the feed elements during transmission would produce a narrow transmitter beam, incapable of linking with the $\Delta$ Receive beams at the receiver site. For signal reception however, the single frequency signal from each feed horn would be combined as before to produce the sum and difference signals thereof.

What is claimed is:

1. A tropospheric scatter communication system having diverse angle and diverse frequency signal transmission modes of operation comprising:

a dual feed antenna system having first and second feed elements whose phase centers are displaced in the azimuthal plane;

a first and a second preselector unit;

a first duplexer for coupling signals of frequency $f_1$ from a first transmitter to said first feed element and for coupling signals received by said first feed element to said first preselector unit;

a second duplexer for coupling signals of frequency $f_2$ from a second transmitter to said second feed element and for coupling signals received by said second feed element to said second preselector unit;

said first and said second preselector units each separating signals of frequencies $f_3$ and $f_4$ received thereby;

first and second hybrid units each having first and second inputs, a signal sum output and a signal difference output;

means for coupling signals of frequency $f_3$ from said first preselector unit to the first input of said first hybrid unit;

means for coupling signals of frequency $f_4$ from said second preselector unit to the first input of said second hybrid unit;

means for coupling signals of frequency $f_4$ from said first preselector unit to the second input of said second hybrid unit;

means for coupling signals of frequency $f_3$ from said second preselector unit to the second input of said first hybrid unit;

first and second receiver means having their inputs coupled to the signal sum and signal difference outputs respectively of said first hybrid unit;

third and fourth receiver means having their inputs coupled to the signal sum and signal difference outputs respectively of said second hybrid unit; and a signal combiner having its inputs coupled to the outputs of said first, second, third and fourth receiver means and providing a single output signal related to the signal of maximum amplitude applied to its inputs.

2. A tropospheric scatter communication system having diverse angle and diverse frequency signal paths comprising:

an antenna system having first and second feed elements whose phase centers are displaced in the azimuthal plane;

a first and a second preselector unit coupled to said first and second feed elements respectively;

said first and said second preselector units each separating signals of frequencies $f_3$ and $f_4$ received thereby;

first and second hybrid units each having first and second inputs, a signal sum output and a signal difference output;

means for coupling signals of frequency $f_3$ from said first preselector unit to the first input of said first hybrid unit;

means for coupling signals of frequency $f_4$ from said second preselector unit to the first input of said second hybrid unit;

means for coupling signals of frequency $f_4$ from said first preselector unit to the second input of said second hybrid unit;

means for coupling signals of frequency $f_3$ from said second preselector unit to the second input of said first hybrid unit;

first and second receiver means having their inputs coupled to the signal sum and signal difference outputs respectively of said first hybrid unit;

third and fourth receiver means having their inputs coupled to the signal sum and signal difference outputs respectively of said second hybrid unit; and a signal combiner having its inputs coupled to the outputs of said first, second, third and fourth receiver means and providing a single output signal related to the signal of maximum amplitude applied to its inputs.

3. A tropospheric scatter communication system having diverse angle and diverse frequency signal paths comprising:

an antenna system having first and second feed elements whose phase centers are displaced in the azimuthal plane;

first and second preselector means coupled to said first and second feed elements respectively;

said first and said second preselector means each separating signals of frequencies $f_3$ and $f_4$ received thereby;

first means coupled to said first and said second preselector means for providing sum and difference signals of signals of frequency $f_3$;

second means coupled to said first and said second preselector means for providing sum and difference signals of signals of frequency $f_4$;

and combiner means coupled to said first means and said second means for selecting the signal of greatest amplitude of said sum and difference signals.

4. A tropospheric scatter communication system having diverse angle signal transmission paths comprising:

a reflector type antenna having a pair of feed elements of substantially identical geometry and signal response characteristics and whose phase centers are displaced in the azimuthal plane;

a hybrid unit having a pair of inputs coupled to respective ones of said pair of feed elements, a signal sum output and a signal difference output;

and means coupled to the signal sum output and the signal difference output of said hybrid unit for selecting the signal of greatest amplitude at said signal sum output and said signal difference output.

* * * * *